Sept. 3, 1963     A. M. SERDAHELY     3,102,413
GONIOMETER
Filed July 20, 1959     3 Sheets-Sheet 1
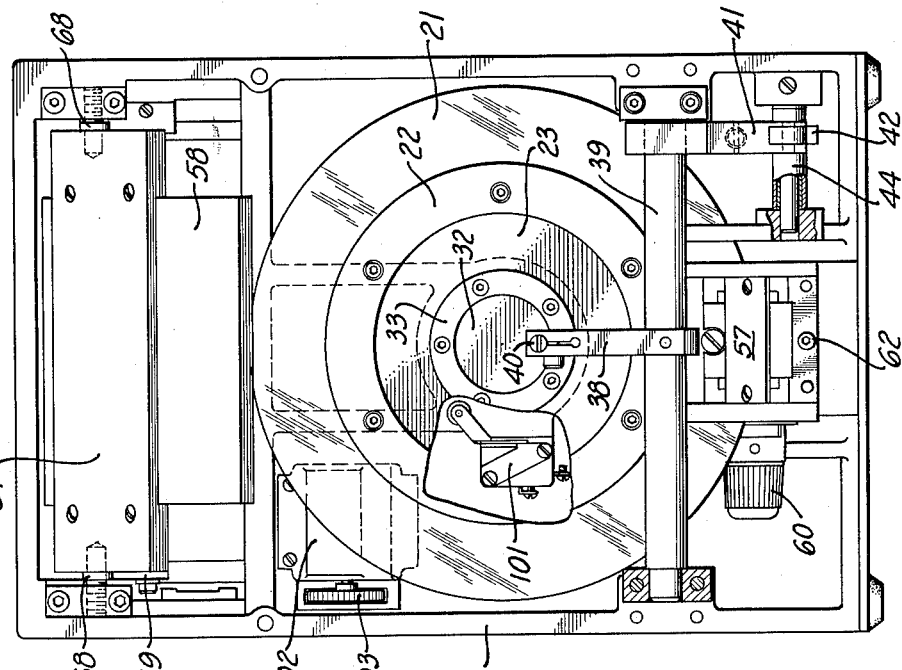
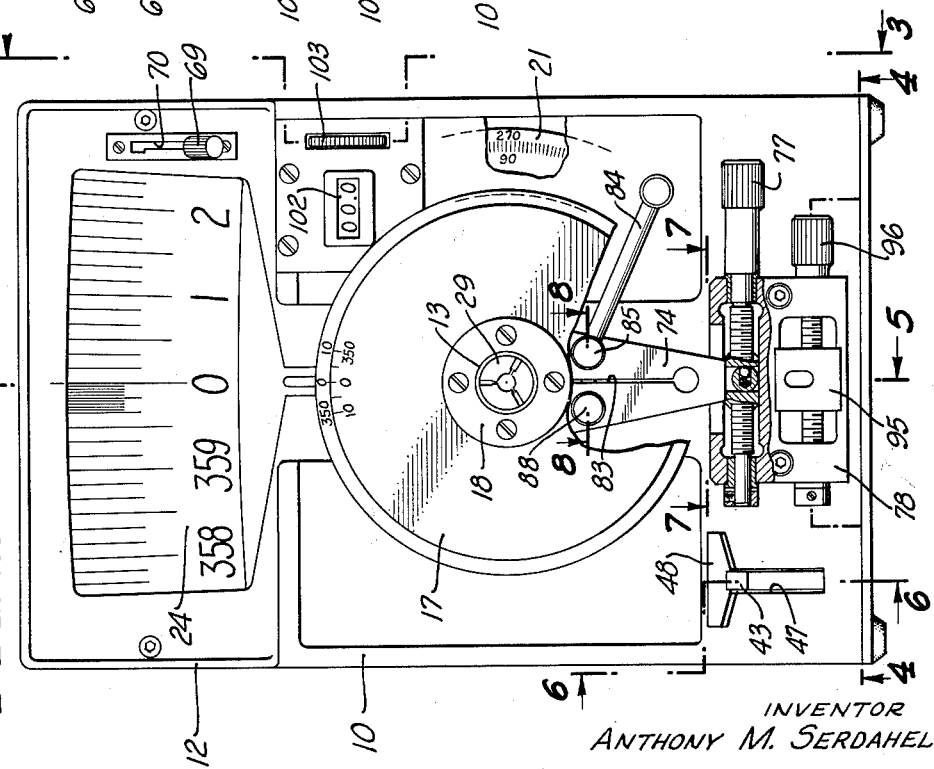
INVENTOR
ANTHONY M. SERDAHELY
BY HIS ATTORNEYS
HARRIS, KIECH, RUSSELL & KERN Sept. 3, 1963　　　A. M. SERDAHELY　　　3,102,413
GONIOMETER
Filed July 20, 1959　　　3 Sheets-Sheet 2
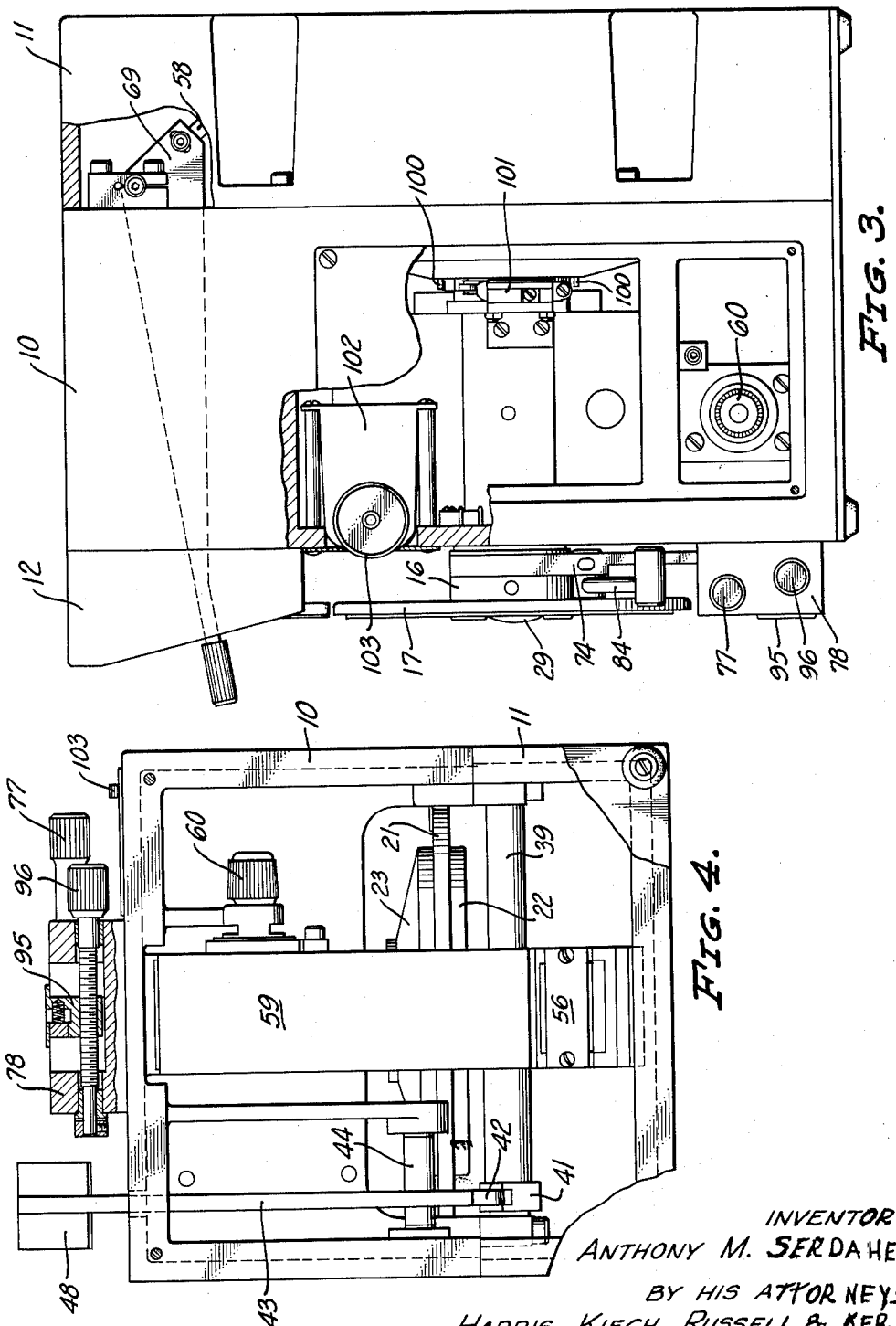
INVENTOR
ANTHONY M. SERDAHELY
BY HIS ATTORNEYS
HARRIS, KIECH, RUSSELL & KERN Sept. 3, 1963  A. M. SERDAHELY  3,102,413
GONIOMETER
Filed July 20, 1959  3 Sheets-Sheet 3
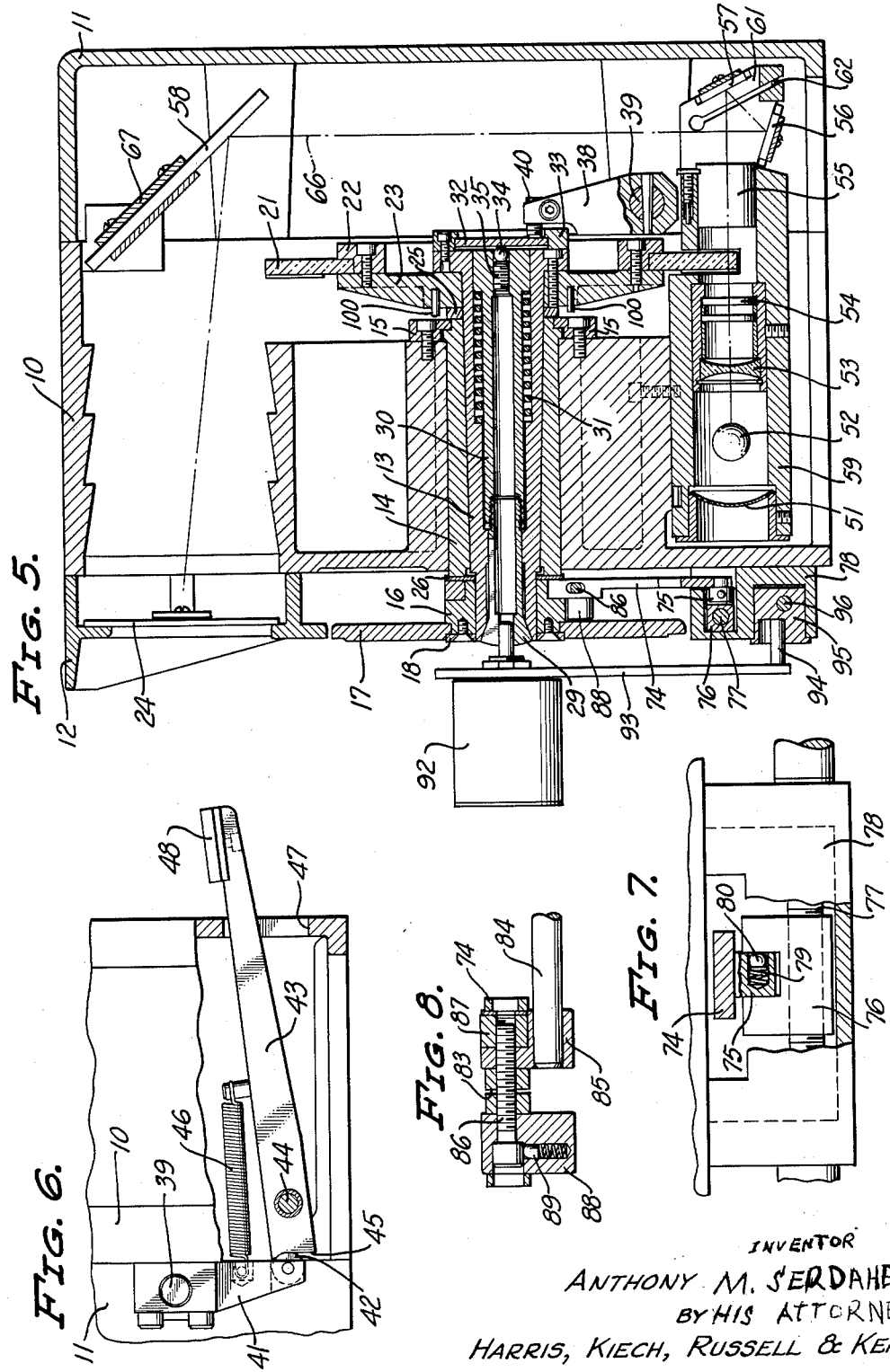
INVENTOR
ANTHONY M. SERDAHELY
BY HIS ATTORNEYS
HARRIS, KIECH, RUSSELL & KERN

3,102,413
GONIOMETER
Anthony M. Serdahely, Costa Mesa, Calif., assignor to Beckman Instruments, Inc., a corporation of California
Filed July 20, 1959, Ser. No. 828,186
8 Claims. (Cl. 73—1)

This invention relates to goniometers and in particular to a direct reading goniometer suitable for testing and calibrating precision rotary components such as potentiometers, resolvers, synchros, rotary inductors and capacitors, and the like. For example, the manufacture of precision potentiometers often requires a measurement of output resistance corresponding to angular displacement of the potentiometer rotor relative to the case. For such a measurement, the output resistance is measured electrically while a goniometer is used to very accurately measure the rotor displacement.

It is often necessary to determine the performance of such rotary components to an angular accuracy of about plus or minus one minute of arc. Instruments are available for measuring angles to this desired accuracy and to even greater accuracy; however, such instruments are in the scientific instrument category and are not suitable for production use. The production type equipment presently available for making angle measurements utilizes vernier devices which require considerable manipulation and interpretation by the operator introducing both operator error and the handicap of operator fatigue. At the same time, such instruments do not approach the desired accuracy of plus or minus one minute of arc. Accordingly, it is an object of the invention to provide a direct reading goniometer having an accuracy in the order of one minute of arc, which instrument is easily operated, simple, rugged and suitable for continuous use in production testing. A further object is to provide such an instrument that is an integral device requiring only the mounting and removal of the rotary component, with the angular indication being directly viewable on the face of the instrument.

It is an object of the invention to provide a goniometer having a rotating spindle which carries a collet for clamping the shaft of the component being tested and also carries a graduated disc which provides the desired angular information. A further object is to provide such an instrument with a lever system for actuating the collet while in any angular position to engage and release the shaft of the component being tested. Another object is to provide such an instrument in which the concentricity and alignment of the collet, spindle and graduated disc are not disturbed by the collet actuating system.

It is an object of the invention to provide a goniometer having a relatively coarsely graduated plate carried on the spindle for manual rotation of the spindle to the approximately desired angular position. A further object is to provide such an instrument having a lead screw and spindle lever arm for fine angular movement of the spindle, with the lever arm being releasably clamped to the spindle so that large angular changes can be made with the lead screw and lever arm free. A further object is to provide such an instrument having means for clamping the case of the component being tested to a component arm and lead screw for fine rotation of the component case.

It is an object of the invention to provide a direct reading goniometer suitable for use with components which operate through more than one revolution, such as multiturn potentiometers, delay lines and the like. A further object is to provide such an instrument having an impulse generator actuated by rotation of the spindle with the generator driving an impulse counter positioned at the face of the instrument for a direct indication of the number of revolutions as well as the minutes of arc through which the component has been rotated. Another object is to provide a goniometer having a graduated scale which is directly readable in minutes of arc for both directions of rotation. A further object is to provide such an instrument wherein only a single set of indicia together with the graduations is presented to the operator with the set of indicia corresponding to the direction of rotation of the spindle, and with the instrument having a lever system for changing the set of indicia which is being viewed by the operator.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:
FIG. 1 is a front view of a preferred embodiment of the present invention;
FIG. 2 is a rear view of the instrument of FIG. 1 with the rear cover removed;
FIG. 3 is a sectional view taken along the line 3—3 of FIG. 1;
FIG. 4 is a sectional view taken along the line 4—4 of FIG. 1;
FIG. 5 is a sectional view taken along the line 5—5 of FIG. 1;
FIG. 6 is a partial sectional view taken along the line 6—6 of FIG. 1;
FIG. 7 is a partial sectional view taken along the line 7—7 of FIG. 1; and
FIG. 8 is a partial sectional view taken along the line 8—8 of FIG. 1.

The embodiment of the invention disclosed herein is contained in a housing comprising a frame 10, a rear cover 11 and a viewing screen cover 12. A spindle 13 is positioned in a long tapered bearing 14 carried in the frame, the bearing being held in place by two diametrically opposed clips 15 (FIG. 5). A collar 16 is fixed to the forward end of the spindle and a graduated plate 17 is clamped to the collar by a ring 18. The plate 17 has a band of graduations around its edge, best seen in FIG. 1. The marks are relatively widely spaced, being 5° of arc in the embodiment illustrated herein. Bands of indicia advancing in 10° intervals in clockwise and counterclockwise directions are also applied to the plate.

A disc 21 is carried on the inward end of the spindle 13 by a ring 22 and plate 23. The disc is made of a transparent material such as glass and carries a band of very precise graduations along its edge, a portion of the disc being shown in FIG. 1. In this embodiment, the smallest graduation on the disc 21 is two minutes of arc resulting in 10,800 graduations on the disc. The graduations are numbered at 1° intervals in both clockwise and counterclockwise directions. Of course, the illustration in FIG. 1 does not show each graduation nor each number, although each graduation can be seen in a portion of the disc that is projected onto a screen 24 as seen in the upper portion of FIG. 1. Washers 25, 26 on the spindle provide for axially positioning the spindle within the bearing 14.

A means is provided in the spindle for clamping the shaft of a component to be tested. A removable collet 29 is threaded into a drawbar or sleeve 30 and the collet and drawbar are movable axially as a unit relative to the spindle to expand and contract the collet. The collet is removable from the drawbar so that various sizes of shafts can be accommodated by the instrument. A compression coil spring 31 is positioned around the drawbar and within the spindle with the ends of the spring respectively engaging the drawbar and spindle to urge the drawbar and the collet to the right, toward the retracted shaft clamping position. Means are provided for compressing the spring 31 and moving the collet and drawbar to the left to the extended, shaft-free position.

The collet actuating system includes a hardened plate 32 positioned at the end of the spindle by a ring 33. The plate engages a hardened ball 34 carried at the end of the drawbar and adjustably located therein by a set screw 35. The spring 31 urges the ball 34 into engagement with the plate 32, moving the plate to the right against the ring 33 as seen in FIG. 5. The elements are adjusted so that when in this position, the collet is in the clamping position. A crankarm 38 is mounted for rotation on a shaft 39 which in turn is carried in the frame 10. A hardened screw 40 is carried in the end of the crankarm 38 for engaging the plate 32 at the periphery thereof to rotate the plate clockwise when the crankarm is rotated counterclockwise as viewed in FIG. 5. Clockwise rotation of the plate 32 produces translation of the collet to the left, moving the collet to the extended free position for insertion and removal of a component shaft. The plate 32 rotates with the spindle and the lever system provides for actuation of the collet for any angular position of the spindle.

The lever system also includes a crankarm 41 mounted on the shaft 39 and having a roller 42 at its free end. A lever 43 is pivotally mounted in the frame 10 on a shaft 44 and carries a cam surface 45 for engaging the roller 42. A tension spring 46 is fixed to pins on the crankarm 41 and the lever 43, urging these components toward the position shown in FIG. 6. The lever 43 projects through an opening 47 in the frame 10 and carries a plate 48 for manual operation of the lever system. Downward pressure on the plate 48 produces clockwise rotation of the shaft 39 as viewed in FIG. 6, or counterclockwise rotation as viewed in FIG. 5, producing the desired extension of the collet for insertion or removal of a component for test.

An integral projection system projects approximately 5° of arc of the disc 21 onto the translucent screen 24 with about twenty times magnification for visual observation by the operator of the instrument. The projection system includes a reflector 51, a lamp 52, condensing lens 53, heat lenses 54, projector lenses 55, and mirrors 56, 57 and 58 (FIG. 5). The reflector and the lenses are mounted in a housing 59 carried on the frame 10 and suitable means are provided for adjusting the lens positions to achieve the desired focus. The lamp 52 is carried in a socket 60 mounted on the side of the housing for ease of replacement. The mirror 56 is carried on an extension of the housing 59 and the mirror 57 is carried on arms 61 projecting from the housing. A screw 62 permits varying the width of the slot separating the arms 61 from the remainder of the housing and adjusting the relative positions of the mirrors.

The light path through the instrument is shown by the dot-dash line 66 in FIG. 5. The edge of the disc 21 moves through the housing 59 so that the light path passes through the disc, thereby projecting the image of the disc on the screen 24. The mirror 58 is clamped to a plate 67 which in turn is pivotally mounted in the frame 10 on pins 68 (FIG. 2). One end of a lever 69 is fixed to the plate 67 and the other end of the lever projects through an opening 70 in the face of the instrument. The opening 70 is provided with two detents, only the upper being visible in FIG. 1, permitting positioning in the mirror 58 in either of two positions. The projection system is constructed so that when the mirror 58 is pivoted to one position, a portion of the band of graduations and one of the indicia bands is visible on the screen 24. Then when the mirror 58 is pivoted to the other position, the other band of indicia is visible on the screen. This provides for direct reading in degrees and minutes of arc for either direction of rotation of the component being tested.

The goniometer of the invention includes means for rapidly rotating the spindle to the approximate desired angular position and means for precisely rotating the spindle to the exact desired angular position. The plate 17 is adapted for rapid angular rotation of the spindle by contacting with the operator's finger. A spindle arm 74 has an opening in one end for positioning around the collar 16 of the spindle 13 (FIGS. 1 and 5). The other end of the spindle arm 74 carries a boss 75 which engages a slide block 76 of a lead screw 77 (FIGS. 1, 5, 7). The lead screw 77 is mounted in suitable bearings in a housing 78 carried on the face of the frame 10. A compression spring 79 and a ball 80 carried in the boss 75 eliminate backlash in the sliding action between the boss and the slide block 76.

The spindle arm 74 has a slot 83 connecting with the opening around the collar 16 so that the arm may be clamped to the collar. The spindle arm is clamped and loosened by actuation of a lever 84 mounted in a shaft 85 that is pivotally mounted in the spindle arm (FIGS. 1, 5, 8). A screw 86 engages a nut 87 which is eccentrically positioned in the shaft 85, the head of the screw abutting another shaft 88 also carried in the spindle arm 74. Arm 74 and shaft 85 have elongated slots, permitting screw 86 to pass through without hindering pivotal movement of the halves of arm 74 or rotary adjustment of shaft 85 (FIGS. 3, 5). A detent mechanism 89 in the shaft 88 restrains rotation of the screw 86. Rotation of the shaft 85 by means of the lever 84 compresses and expands the slot 83 to clamp and free the spindle relative to the spindle arm. The normal width of the slide 83 is controlled by proper adjustment of the screw 86.

A component such as a potentiometer 92 is mounted on the instrument by clamping the component case to a component arm 93 and clamping the component shaft in the collet 29 as shown in FIG. 5. A pin 94 projects from the component arm 93 for engaging a slide block 95 of another lead screw 96, which lead screw is also mounted in the housing 78.

The instrument of the invention is adapted for use with multiturn components such as helical potentiometers and the like and means are provided for counting and indicating the number of revolutions completed by the spindle and hence the component shaft. In the embodiment illustrated herein, a number of pins 100 are equally spaced around the plate 23 to engage the actuating arm of a switch 101, which may be a conventional micro switch (FIGS. 3, 5). The switch is connected between a power source and a counter 102 carried on the frame of the instrument so that each time the switch is actuated, a power pulse is coupled to the counter. In the instrument shown herein, ten pins 100 are utilized and the counter indicates revolutions and tenths of revolutions. A knob 103 is mounted on the countershaft and projects through the face of the instrument for resetting the counter to zero.

The goniometer of the present invention provides for rapid and easy angular measurements with an accuracy of about plus or minus one minute of arc while substantially eliminating errors due to judgment and operator fatigue. The instrument provides for rapid and accurate mounting of the component to be tested and provides a direct reading of the angular rotation of the component shaft. The graduated scale used in the fine measurements is graduated in two minutes of arc, permitting accurate settings to one minute of arc. The shaft of the component is exactly and concentrically positioned in the spindle of the instrument with a quick engage-quick release mechanism after which the spindle is rapidly rotated to the approximate desired angular position. Then the spindle arm is clamped to the spindle and the lead screw provides the exact fine adjustment for shaft positioning. Similarly, a second lead screw provides for exact fine positioning of the component case. A representative application of the present goniometer is in measuring potentiometer linearity. With the output terminals of the potentiometer connected to an electrical resistance measuring circuit, the potentiometer rotor is adjusted to the approximate electrical zero point. The disc 21 is then adjusted to register 0° after which the potentiometer is mounted upon the goniometer by clamping the potentiometer case to the component arm 93 and the potentiometer shaft in the collet 29. The potentiometer case is then adjusted to the point of exact electrical zero by rotating the second lead screw. This adjustment does not affect the position of the spindle so that the dial will remain at 0°. The output potentiometer resistance may then be measured for any desired rotation of the potentiometer shaft by initially rotating the graduated plate 17 to the approximate position and then utilizing the first lead screw to set the rotor to within one minute of arc. Thus it is seen that the objects of the invention are achieved in a single compact instrument which produces a directly readable output as a function of the angular rotation of the component under test.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a direct reading goniometer, the combination of: a housing; a spindle rotatably mounted in said housing; a collet carried by said spindle, said collet being axially movable between a retracted clamping position and an extended free position; spring means carried by said spindle for urging said collet toward said retracted position; lever means mounted in said housing for engaging said collet and urging same to said extended position; a coarse angular indicating means for indicating the approximate angular position of said spindle comprising a plate bearing a coarsely graduated angular displacement scale, said plate being mounted on said spindle perpendicular to the axis thereof and outside said housing adjacent to and visible at said face, with said spindle being rotatable by manual actuation of said plate; and a fine angular indicating means visible from the same position as said coarse angular means for indicating very accurately the position of said spindle comprising a transparent disc bearing the scale of said coarse angular indicating means but with considerably finer graduations, said transparent disc being mounted on said spindle perpendicular to the axis thereof within said housing; a light source mounted in said housing; a display screen mounted in said housing and visible from the exterior thereof; and a light projection system positioned within said housing for directing light from said source through an edge portion of said disc to said screen.

2. In a direct reading goniometer, the combination of: a housing; a spindle rotatably mounted in said housing; clamp means including a collet mounted within said spindle for rotation therewith, said collet having a jaw section facing outward from said housing, said clamp means being axially movable between a retracted clamping position and an extended free position; a coil spring positioned around said clamp means and within said spindle, with the ends of said spring abutting respectively said spindle and said clamp means for urging said clamp means towards said retracted position; lever means mounted in said housing for engaging said clamp means and urging same to said extended position; a coarse angular indicating means for indicating the approximate angular position of said spindle comprising a plate bearing a coarsely graduated angular displacement scale, said plate being mounted on said spindle perpendicular to the axis thereof and outside said housing adjacent to and visible at said face, with said spindle being rotatable by manual actuation of said plate; and a fine angular indicating means visible from the same position as said coarse angular indicating means for indicating very accurately the position of said spindle comprising a transparent disc bearing the scale of said coarse angular indicating means but with considerably finer graduations, said transparent disc being mounted on said spindle perpendicular to the axis thereof within said housing, a light source mounted in said housing; a display screen mounted in said housing and visible from the exterior thereof; and a light projection system positioned within said housing for directing light from said source through an edge portion of said disc to said screen.

3. In a direct reading goniometer, the combination of: a housing; a spindle rotatably mounted in said housing; clamp means including a collet mounted within said spindle for rotation therewith, said collet having a jaw section facing outward from said housing, said clamp means being axially movable between a retracted clamping position and an extended free position; a plate carried in and substantially perpendicular to the axis of said spindle; a coil spring positioned around said clamp means and within said spindle, with the ends of said spring abutting respectively said spindle and said clamp means for urging said clamp means toward said retracted position and into engagement with said plate; an arm pivoted in said housing for contacting said plate adjacent the edge thereof; lever means mounted in said housing for actuating said arm into contact with said plate for urging said clamp means to said extended position; a coarse angular indicating means for indicating the approximate angular position of said spindle comprising a plate bearing a coarsely graduated angular displacement scale, said plate being mounted on said spindle perpendicular to the axis thereof and outside said housing adjacent to and visible at said face, with said spindle being rotatable by manual actuation of said plate; and a fine angular indicating means visible from the same position as said coarse angular indicating means for indicating very accurately the position of said spindle comprising a transparent disc bearing the scale of said coarse angular indicating means but with considerably finer graduations, said transparent disc being mounted on said spindle perpendicular to the axis thereof within said housing, a light source mounted in said housing; a display screen mounted in said housing and visible from the exterior thereof; and a light projection system positioned within said housing for directing light from said source through an edge portion of said disc to said screen.

4. In a direct reading goniometer, the combination of: a housing having a front face substantially vertical to the base thereof; a spindle mounted in said housing for rotation about an axis substantially perpendicular to said face; a collet carried by said spindle, said collet being axially movable between a retracted clamping position and an extended free position; spring means carried by said spindle for urging said collet towards said retracted position; lever means mounted in said housing for engaging said collet and urging same to said extended position, said lever means including an actuating arm projecting from said front face; a coarse angular indicating means for indicating the approximate angular position of said spindle comprising a plate bearing a coarsely graduated angular displacement scale, said plate being mounted on said spindle perpendicular to the axis thereof and outside said housing adjacent to and visible at said face, with said spindle being rotatable by manual actuation of said plate; and a fine angular indicating means visible from the same position as said coarse angular indicating means for indicating very accurately the position of said spindle comprising a transparent disc bearing the scale of said coarse angular indicating means but with considerably finer graduations, said transparent disc being mounted on said spindle perpendicular to the axis thereof within said housing, a light source mounted in said housing adjacent to the base thereof, a display screen mounted in said housing above and closely adjacent to said plate and visible from said front face, and a light projection system positioned within said housing for directing light from said light source through an edge portion of said disc to said screen.

5. In a direct reading goniometer, the combination of: a housing; a spindle rotatably mounted in said housing; a collet carried by said spindle, said collet being axially movable between a retracted clamping position and an extended free position; spring means carried by said spindle for urging said collet toward said retracted position; a transparent disc having relatively fine graduations and mounted on said spindle for rotation therewith; a plate having relatively coarse graduations and mounted on said spindle for direct manual rotation of said spindle to an approximate desired position; a lead screw carried in said housing for rotation about an axis in a plane substantially perpendicular to the axis of rotation of said spindle; a spindle rotation arm having one end mounted on said lead screw for movement along the lead screw axis and having the other end mounted on said spindle; means for releasably clamping said other end on said spindle for rotation of said spindle as a function of said lead screw rotation; lever means mounted in said housing for engaging said collet and urging same to said extended position; a light source mounted in said housing; a display screen mounted in said housing and visible from the exterior thereof; and a light projection system positioned within said housing for directing light from said source through an edge portion of said disc to said screen for determining an exact desired position as said spindle is rotated by said lead screw.

6. In an apparatus for measuring rotation of the shaft of a component relative to the case thereof, the combination of: a housing; a spindle rotatably mounted in said housing with a portion of said spindle projecting from said housing for manual rotation; means for mounting said shaft to said spindle comprising a collet carried by said spindle for gripping the component shaft, said collet being axially movable between a retracted shaft clamping position and an extended shaft free position and spring means carried by said spindle for urging said collet towards said retracted position; lever means mounted in said housing for engaging said collet and urging same to said extended position; means for coarsely positioning and indicating the approximate angular position of said spindle comprising a plate bearing a coarsely graduated angular displacement scale mounted on said spindle for rotation therewith; means for finely positioning said spindle comprising a first lead screw carried in said housing for rotation about an axis in a plane substantially perpendicular to the axis of rotation of said spindle, a spindle rotation arm having one end mounted on said first lead screw for movement along the lead screw axis and having the other end mounted on said spindle, means for releasably clamping said other end on said spindle for rotation of said spindle as a function of said first lead screw rotation; means for rotating the component case relative to the shaft thereof comprising a second lead screw carried in said housing for rotation about an axis in a plane substantially perpendicular to the axis of rotation of said spindle, a component rotation arm having one end mounted on said second lead screw for movement along the lead screw axis and having the other end adapted for mounting on the component case for rotation of the case as a function of said second lead screw rotation; and a fine angular indicating means visible from the same position as said coarse angular positioning means for indicating very accurately the position of said spindle comprising a disc mounted on said spindle for rotation therewith, said disc having a transparent periphery graduated in the same scale as said coarse angular positioning means but with considerably finer graduations, a light source mounted in said housing; a display screen mounted in said housing and visible to the exterior thereof; and a light projection system positioned within said housing for directing light from said source through an edge portion of said disc to said screen.

7. In a direct reading goniometer, the combination of: a housing; a spindle rotatably mounted in said housing; a collet carried by said spindle, said collet being axially movable between a retracted clamping position and an extended free position; spring means carried by said spindle for urging said collet toward said retracted position; an impulse counter mounted in said housing; an impulse generator coupled to said counter in driving relationship; means carried on said spindle for actuating said generator as a function of rotation of said spindle whereby said counter produces a record of the rotational history of said spindle; lever means mounted in said housing for engaging said collet and urging same to said extended position; a coarse angular indicating means for indicating the approximate angular position of said spindle comprising a plate bearing a coarsely graduated angular displacement scale, said plate being mounted on said spindle perpendicular to the axis thereof and outside said housing adjacent to and visible at said face, with said spindle being rotatable by manual actuation of said plate; and a fine angular indicating means visible from the same position as said coarse angular indicating means for indicating very accurately the position of said spindle comprising a transparent disc bearing the scale of said coarse angular indicating means but with considerably finer graduations, said transparent disc being mounted on said spindle perpendicular to the axis thereof within said housing, a light source mounted in said housing; a display screen mounted in said housing and visible from the exterior thereof; and a light projection system positioned within said housing for directing light from said source through an edge portion of said disc to said screen.

8. In a direct reading goniometer, the combination of: a housing; a spindle rotatably mounted in said housing; a collet carried by said spindle, said collet being axially movable between a retracted clamping position and an extended free position; spring means carried by said spindle for urging said collet toward said retracted position; angular positioning means for directly indicating the rotation of said spindle for either direction of rotation comprising a disc mounted on said spindle for rotation therewith, said disc having an inner band of indicia, a band of graduations and an outer band of indicia, with said inner indicia advancing for one direction of rotation of said disc and said outer indicia advancing for the opposite direction of rotation, first lever means mounted in said housing for engaging said collet and urging same to said extended position, a light source mounted in said housing, a display screen mounted in said housing and visible from the exterior thereof, a light projection system positioned within said housing for directing light from said source through an edge portion of said disc to said screen to project a portion of two adjacent bands onto said screen, said system including a pivoted mirror for changing the direction of light toward said screen and second lever means mounted in said housing for controlling said pivoted mirror and selecting pairs of bands of said disc for projection on said screen.

References Cited in the file of this patent

UNITED STATES PATENTS

| | | |
|---|---|---|
| 2,396,521 | Mead | Mar. 12, 1946 |
| 2,566,875 | Dietrich et al. | Sept. 4, 1951 |
| 2,588,269 | Mettler et al. | Mar. 4, 1952 |
| 2,599,005 | MacGeorge et al. | June 3, 1952 |
| 2,676,515 | Diehl | Apr. 27, 1954 |
| 2,775,755 | Sink | Dec. 25, 1956 |
| 2,804,594 | Bjong et al. | Aug. 27, 1957 |
| 2,809,540 | Schultze | Oct. 15, 1957 |
| 2,811,692 | Ebbs et al. | Oct. 29, 1957 |
| 2,830,473 | Brown | Apr. 15, 1958 |

FOREIGN PATENTS

| | | |
|---|---|---|
| 928,228 | France | May 26, 1947 |
| 805,810 | Germany | Aug. 20, 1951 |